W. S. SMITH AND F. S. WILLIAMS.
CAMERA.
APPLICATION FILED FEB. 2, 1920.

1,419,323.

Patented June 13, 1922.
3 SHEETS—SHEET 1.

Inventors
F. S. Williams
W. Saul Smith
By Ralph Kalish Atty.

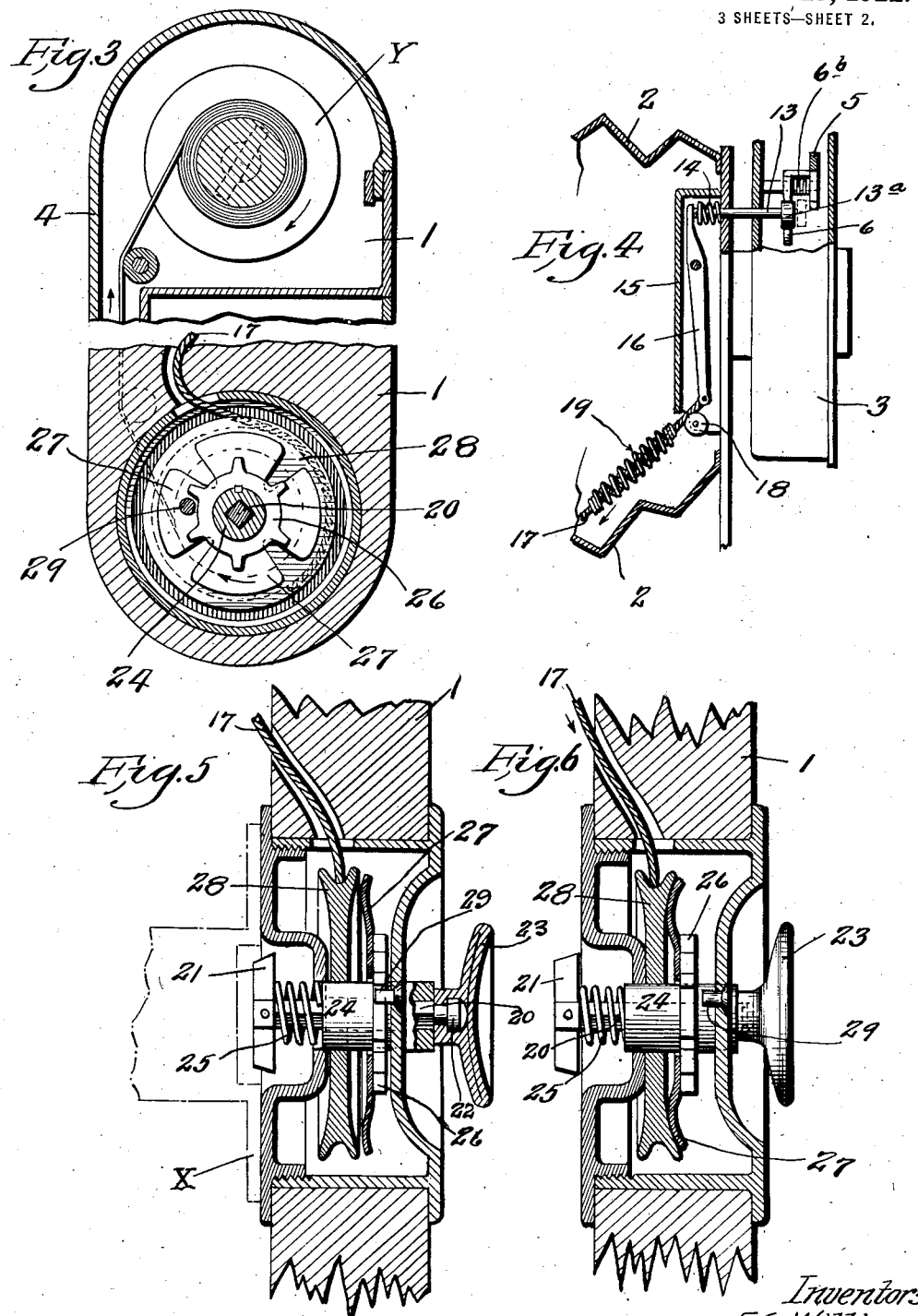

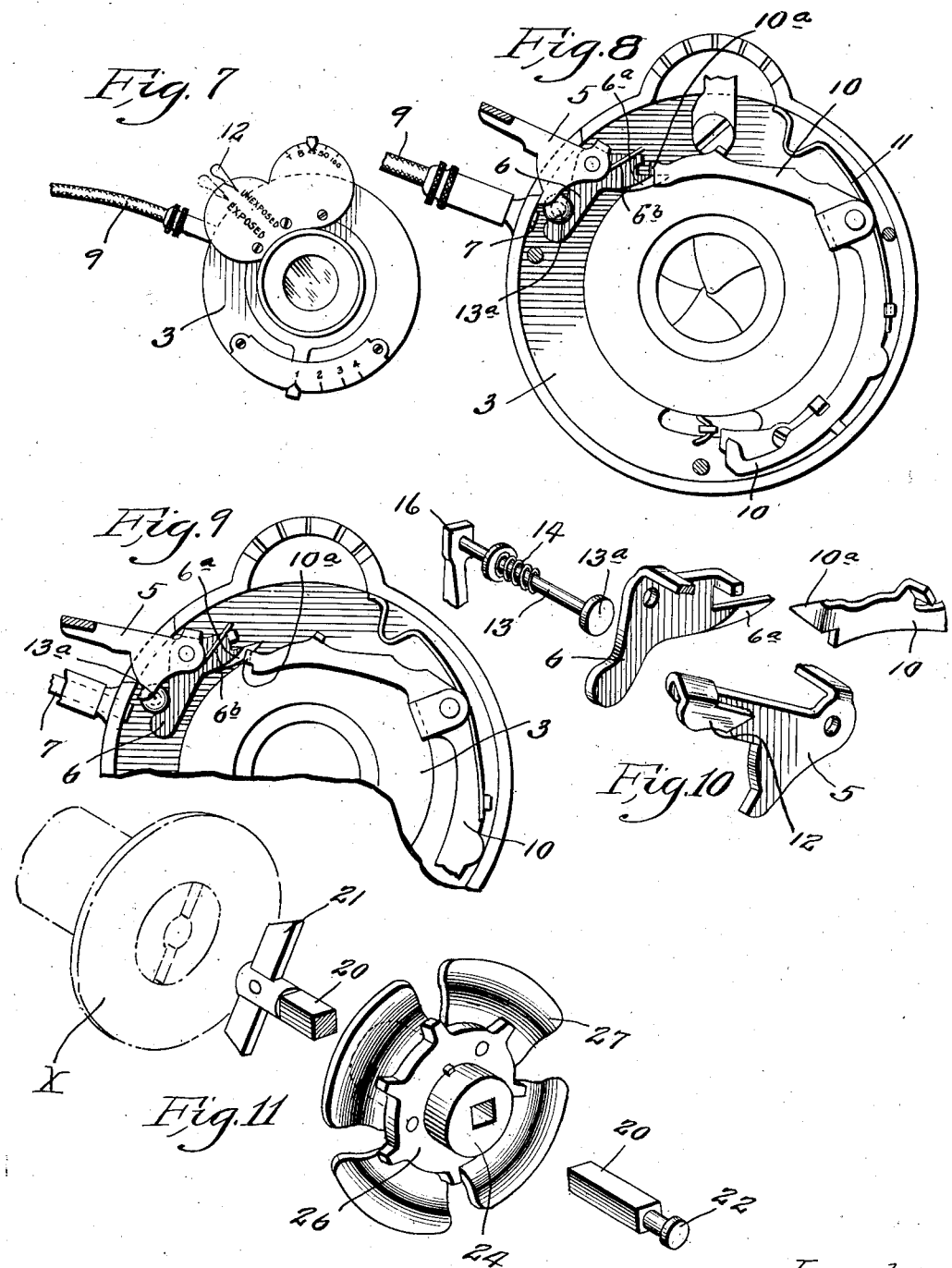

UNITED STATES PATENT OFFICE.

WILLIAM SAUL SMITH, OF BALTIMORE, MARYLAND, AND FREDERIC S. WILLIAMS, OF PHILADELPHIA, PENNSYLVANIA.

CAMERA.

1,419,323.     Specification of Letters Patent.     Patented June 13, 1922.

Application filed February 2, 1920. Serial No. 355,745.

*To all whom it may concern:*

Be it known that we, WILLIAM SAUL SMITH and FREDERIC S. WILLIAMS, citizens of the United States, residing, respectively, at the city of Baltimore, State of Maryland, and at the city of Philadelphia, State of Pennsylvania, have jointly invented a certain new and useful Improvement in Cameras, of which the following is a specification, reference being had to the accompanying drawings forming a part thereof.

This invention relates to a certain new and useful improvement in cameras.

The principal objects of our invention are to provide a camera with means whereby, when the shutter has been opened to make an exposure and then closed, the shutter cannot be re-opened until movement of a new film-section into position, duplication or doubling of exposures on the same film-section being thereby guarded against; to provide the camera with means for locking the film-roll against movement until released by the mechanism which releases and unlocks the shutter as the film is used; and to provide the camera, in connection with the locking of the shutter closed after each exposure until the film is rolled, with an automatic signalling device for indicating to the user whether or not the film has been rolled and the camera ready for a new or second exposure.

With the above and other objects in view, our invention resides in the novel features of form, construction, arrangement, and combinations of parts hereinafter described and afterwards pointed out in the claims.

In the accompanying drawings.

Figure 3 is a sectional view of the camera, showing a portion of our invention in its relation to the film winding-mechanism;

Figure 4 is a detail view, showing a portion of our invention which is identified or associated with the shutter-mechanism of the camera;

Figure 5 is a sectional view, showing the friction-clutch used in connection with the film unwinding-spool;

Figure 6 is a similar view, showing the parts in a different or changed position;

Figure 7 is a front elevational view of the shutter casing and lens of the camera;

Figure 8 is an elevational view of the shutter operating mechanism of the camera;

Figure 9 is a similar view, partly broken away, showing the parts in a different or changed position;

Figure 10 is a detail view of the dismantled parts of a portion of the shutter mechanism; and Figure 11 is a detail view of the dismantled parts of the friction mechanism identified or associated with the film unwinding spool.

Figure 1:
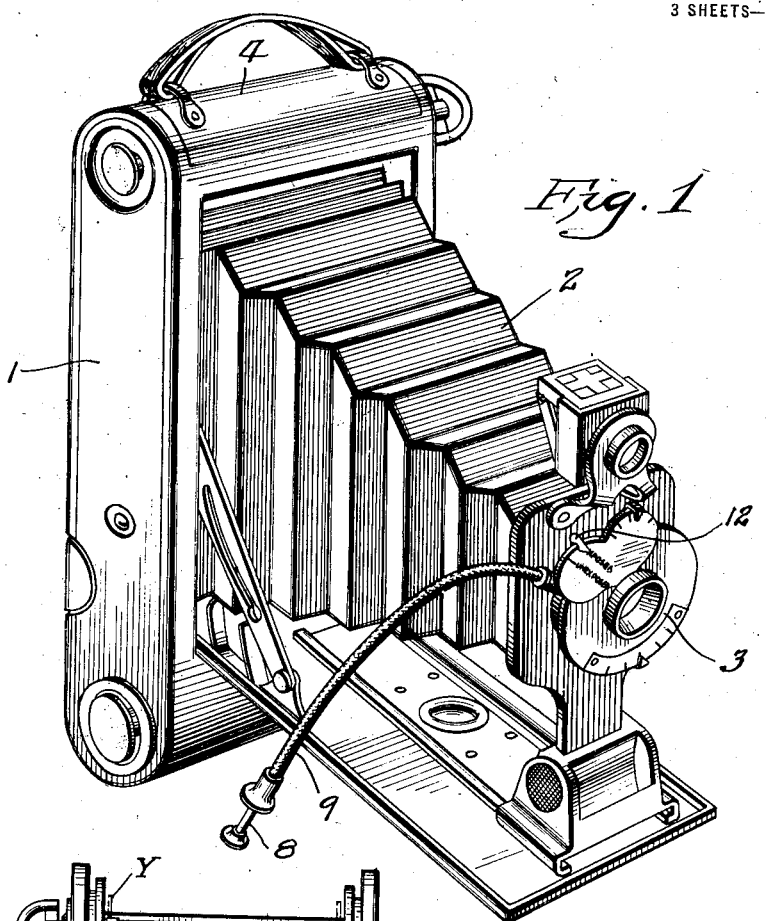
Figure 1 is a perspective view of a camera equipped with and embodying our invention.
Figure 2:
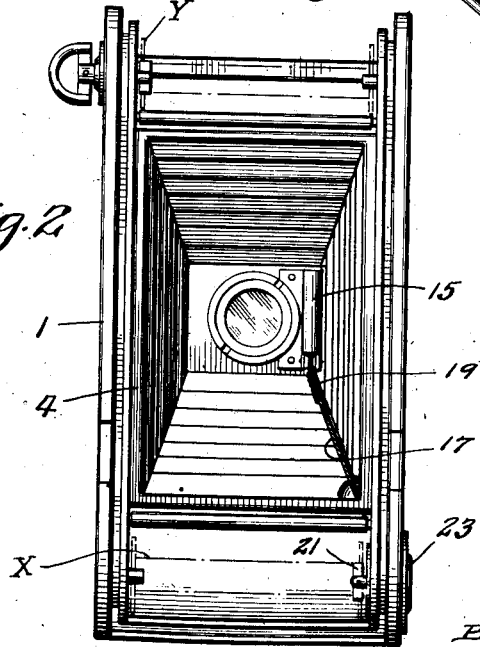
Figure 2 is a rear view of the camera with the back-plate removed.

Referring now more in detail to the said drawings which illustrate a practical embodiment of our invention and in which like reference characters refer to like parts throughout the several views, we have shown a camera of a well-known bellows make to which we have applied our invention, but it is obvious that our invention is equally applicable to other makes of cameras, with such changes as would be made by a skilled mechanic. In the particular camera shown, 1 indicates the box-portion thereof, 2 the bellows, and 3 the shutter housing or casing. The back 4 of the box-portion is removable, as usual, and the film-spools, empty and full, are arranged in position as usual. Indeed the camera is operated as usual, except that in winding the film, a button is pressed opposite the full or film-supplying spool, for purposes which will shortly appear.

In order to more clearly understand the operation of our invention, it may be well to briefly describe the general operation of the camera which we have selected for purposes of illustrating our invention. The shutter-housing 3, located at the outer end of the bellows 2 of the camera, contains a trigger mechanism for operating the shutter. This trigger mechanism consists of a tripping-dog 5 having an outwardly-extending handle which may be manipulated, the dog being connected to and conjointly operable with a member 6 in the form of a bell-crank lever, one end of which lies in the path of a plunger 7 operated by bulb or hand-operated plunger 8 arranged at the end of the flexible tube 9. The inner end of the member 6 is provided with a beveled portion 6ª, which co-operates with a bent cam-faced or beveled end 10ª of a shutter operating lever 10. When the lever 5 is depressed manually, or the plunger 7 is moved inwardly, the member 6 will be operated, whereby the beveled end 6ᵃ lying under the end 10ᵃ of lever 10 will operate the lever 10 and, by virtue of the divergent arcs of movement of these parts, beveled end 6ᵃ will slip from under and eventually be located above the end 10ᵃ of lever 10, whereupon, by means of a spring 11, the lever 10 will be restored to its normal position, and when the member 6 is released, it likewise, by virtue of a spring 6ᵇ will be returned to its position. In returning to its position, the member 6 will have its beveled end 6ᵃ pass under the beveled end 10ᵃ in readiness for another operation. This is the normal operation of such parts of the shutter mechanism with which our invention has to do, and it may be well to state that we make no claim to any of the shutter mechanism just described.

It is obvious from the above description that if the member 6 is prevented from returning to its home or numeral position, that is to say, to such a position in which its end 6ᵃ can operate the end 10ᵃ, of the shutter actuating lever 10 the shutter is disabled and cannot again be operated until the parts are restored home and also any movement or operation of the lever 5 or of the plunger 7 will be idle though simply vibrating the member 6 without operating the lever 10.

12 is an indicator arranged on the outer end of the lever 5 and which in the operative or normal position of the member 6 points to a word, such as "unexposed," on the plate attached to the shutter casing, to indicate that the shutter is capable of being operated. This indicating hand, when the member 6 is disabled and is not in its home or normal position, points to a word such as "exposed" on the shutter casing. The purpose of this indicating hand and its indication to the words "unexposed" and "exposed," or similar terms, symbols, or signs, is obvious.

The means for preventing the return of the member 6 to its home or normal position after the shutter has been operated by said member 6 consists of a pin 13 mounted in the shutter housing and normally held rearwardly by a spring 14 (see Figure 4), so that the head 13ᵃ of the pin lies in the path of the tail portion of the member 6. When the member 6 is home, the head of the pin rests upon the tail portion thereof, as indicated by dotted lines in Figure 4. This pin and its operating parts, which we are about to describe, are the added attachments to the camera which are not present on the commercial camera.

The rear end of the pin 13 extends into a housing or tube 15 secured to the front bellows plate and lies in the path of movement of a lever 16 mounted within said tube or casing, the lower end of said lever being connected to a cable, string or other flexible member 17 which passes over an idle roller 18 mounted in the lower end of the tube.

In order to make the cable or string resiliently flexible, we arrange a coil spring 19 thereon and secure both ends of the spring to the string 17 and between these secured ends provide a slack in the cable or string. By this construction, a yielding pull is exerted on the lever 16 until the slack in the cable or string is taken up whereupon a straight pull is exerted on said lever. The pull on the lower end of the lever 16 by the cable or string, or through the initial instrumentality of the spring 19, will move the head of pin 13 forwardly out of the path of the member 6, permitting said lever 6 to return home in readiness for another operation.

As is well known, in the construction and operation of cameras of the kind we have selected with which to illustrate our invention, the empty or winding spool is arranged at one the so-called upper end of the camera and so positioned that its slotted end will cooperate with the winged end of the winding stem. The full or feeding spool of film is arranged in the lower chamber or compartment and its slotted end, when in position, is diagonally opposite the slotted end of the winding spool in the upper compartment.

Ordinarily there are two button-headed pintles for the full spool which are withdrawn to enable the full spool to be placed in position after which they are pushed inwardly, so that their pintles constitute trunnions on which the full spool is spent or unwound. In our construction, we change the construction of one of these button-headed pintles, as shown in Figures 5 and 6. Fixed operatively in the wall of the camera, is a casing or shell, whose opposite outer walls are preferably inwardly recessed, as best seen in Figures 5 and 6, and disposed transversely of and through such casing is a square shank 20, which is provided at its projecting inner end with winged extensions 21 designed to fit in the winding slot of the spool X. This square shank has a circular knob 22 on its projecting outer end, on which is loosely mounted a button head 23. Disposed upon the shank 20 with its opposite ends projecting for longitudinal movement through the opposite recessed side walls of said casing, as seen in Figures 5 and 6, is a sleeve 24, the inner end of which bears upon a spring 25 interposed therebetween and the wings 21. Spring 25 operates to maintain the wings 21 in their normal position, illustrated in Figure 5. When in this position, the wings 21 occupy the slot in the end of the spool X carrying the unexposed film. The depth of the spool-slot is greater than the width of the wings 21, so that the wings 21 move inwardly into the spool-slot when the parts are in the position thereof illustrated in Figure 6. On inserting a spool X, carrying unexposed film, in position in the camera, wings 21 are moved or pressed outwardly into the pocket provided in the camera, spring 25 being thereby compressed. After the spool X is in position in the camera, the spool is sufficiently rotated to bring its slot in line with the wings 21, when under the force of spring 25, the wings 21 will be yieldingly moved inwardly and into the spool-slot. The sleeve 24 has a star wheel 26 conjoined thereto and movable therewith. This star wheel carries a friction disk or clutch 27, which may be riveted thereto, said disk or clutch being slotted, for obvious reasons, and whose friction plates bear against a rotatable member or pulley 28 loosely mounted on the sleeve 24 and around which the cable 17 is designed to be wound. It may be stated here that shank 20 is square in cross-section and that the opening in sleeve 24, through which the shank passes, is of corresponding section, so that, while shank 20 and sleeve 24 are in rotative engagement and will move rotatively together, the shank 20 and sleeve 24 are independently movable longitudinally.

29 indicates a pin secured to the housing or side wall of the camera, which pin cooperates with the teeth of the star wheel. This pin constitutes a lock for the feeding or spending spool when it is in engagement with the star wheel, but when the star wheel is pushed inwardly, as shown in Figure 6, where it is out of engagement with the pin, the feeding or spending spool may be unwound.

The operation of our device is as follows: Assuming that the camera contains an empty or winding spool Y in its upper compartment (Figure 3) upon which the protective black paper of the feeding spool has been started and the camera is in condition for operation, the back being on the box, the bellows preferably extended, the focal distance determined, etc., and the film is in position for the first exposure; the operator now presses the button 8 or manipulates the lever 5 and makes the exposure in the usual and ordinary way. When the member 6 is vibrated, the head 13ª of the pin 13 moves rearwardly in its path or trips behind the tail portion thereof, so that when the member 6 moves toward its home position, it is arrested at such a point in its movement that its beveled end 6ª has not passed under the tail portion 10ª of the shutter operating lever 10; hence, while the member 6 can be vibrated by either the manipulation of lever 5 or the operation of the plunger 7, such vibration will be idle and the shutter cannot again be opened, because of the presence of the head of the pin 13 in the returning-path of member 6. The operator is thereupon forced to manipulate some moving part of the camera to move the head of the pin 13 out of the returning path of the member 6, and in the present illustration, this is done by winding the spool Y to displace the exposed surface of the film by an unexposed surface. In order to do this, the operator normally presses the button head 23 inwardly, whereupon, under the pressure exerted upon buttonhead 23, the sleeve 24 and its conjoined star-wheel 26 move inwardly against the tension of spring 25 upon shank 20 and the star-wheel thus disengaged from its locking pin 29, thereby permitting the feeding spool or the bottom spool X containing the unexposed portion of the film to be unwound by the operation of the operator turning the winding handle in winding up the exposed portion of the film on the winding spool Y. By the inward movement of the button head 23, and the consequent inward movement of sleeve 24 and its carried star-wheel 26 and friction-disk 27, not only is the star wheel unlocked, as described, but the friction-disk 27 is also carried inwardly into driving or clutching engagement with the pulley 28, which pulley 28 is thereby forced, by virtue of the construction shown, to frictionally rotate with the film-supplying or feeding spool. This places a tension on the cord 17 and, through the yielding connection in the form of the spring 19, the lever 16 is operated to move the pin 13 forwardly to place its head in advance of the tail portion, and out of the returning path, of the member 6, thereby permitting the member 6 to return home and enabling or placing in readiness the shutter-opening mechanism for another operation.

Under the manual pressure of the operator upon button 23, the sleeve 24 will be maintained in such described inward position, with the star-wheel 26 unlocked and the friction-disk 27 engaging the pulley 28.

On manual pressure upon the button 23 being released, the pin 13 by its spring 14 and the parts 24, 26, and 27 by the spring 25 will be returned or restored to normal position, friction on pulley 28 through the disk 27 being removed and the wheel 26 locked against rotation by the pin 29.

Thus in a most efficient, but simple and convenient manner, the movements of the shutter and film-roll are largely correlated, the shutter-opening mechanism, on each exposure, being disabled to open the shutter until movement of a new section of film to exposure-position has been initiated, whereby we positively guard against the duplication or doubling of exposures on the same section of film. It will be noted also that the film-roll is locked against movement until released by depression of the button 23, which forms part of the mechanism for releasing and unlocking the shutter as the film is used or rolled. By our invention also, and as will now be evident, the user or operator of the camera is enabled to at once, at a glance, determine, through the automatic action of the indicator-hand or signal described, whether the camera is ready or in condition for an exposure.

We are aware that changes in the form, construction, arrangement, and combination of the several parts of our camera mechanism may be made and substituted for those herein shown and described without departing from the nature and principle of our invention.

Having thus described our invention, what we claim and desire to secure by Letters Patent is:

1. In a camera, the combination with the shutter-opening mechanism, of means for disabling said mechanism on an exposure to guard against duplication of exposures on the same film-section, film-winding-mechanism, means for locking the film-winding mechanism against operation, and means for releasing the film-winding mechanism and operatively connecting the disabling-means and the film-winding mechanism, whereby, on operation of the film-winding mechanism, the disabling-means will be actuated to again enable the shutter-opening mechanism.

2. In a camera, the combination with the shutter-opening mechanism, of means for disabling said mechanism on an exposure to guard against duplication of exposures on the same film-section, film-winding mechanism, means for locking the film-winding mechanism against operation, and means including a manipulative device under control of the operator for releasing the film-winding mechanism and operatively connecting the disabling-means and the film-winding mechanism, whereby, on operation of the film-winding mechanism, the disabling-means will be actuated to again enable the shutter-opening mechanism.

3. In a camera, the combination with the shutter-opening mechanism, of means for disabling said mechanism on an exposure to guard against duplication of exposures on the same film-section, film-winding mechanism, means operable by the film-winding mechanism for actuating the disabling-means to again enable the shutter-opening mechanism, and a lock including a manipulative member under the control of the operator for the film-winding mechanism, the release of the lock being a condition precedent to operation of the film-winding mechanism.

4. In a camera, the combination with the shutter-opening mechanism, of means for disabling said mechanism on an exposure to guard against duplication of exposures on the same film-section, a film-spool pintle, means for locking the pintle against rotation, and means for releasing the pintle locking-means and operatively connecting the pintle with the disabling-means, whereby, on rotation of the pintle, the disabling-means will be actuated to again enable the shutter-opening mechanism.

5. In a camera, the combination with the shutter-opening mechanism, of means for disabling said mechanism on an exposure to guard against duplication of exposures on the same film-section, a film-spool pintle, a pulley, a connection between the pulley and disabling-means, means for locking the pintle against rotation, a clutch-member on the pintle, and means for releasing the pintle and throwing the clutch into engagement with the pulley, whereby, on rotation of the pintle, the disabling-means will be actuated to again enable the shutter-opening mechanism.

6. In a camera, the combination with the shutter-opening mechanism, the same including a pivoted lever, of a pin adapted to yieldingly project in the returning path of the lever for disabling said mechanism on an exposure to guard against duplication of exposures on the same film section, film winding-mechanism, means for actuating said pin relatively to said lever to again enable the shutter-opening mechanism on actuation of the film winding mechanism to present a new film-section for exposure, means for locking the film winding mechanism against actuation, and means for operatively connecting the pin actuating mechanism with the film winding mechanism on release actuation of the locking means.

7. In a camera, the combination with the shutter-opening mechanism, the same including a pivoted lever, of a pin adapted to yieldingly project in the returning path of the lever for disabling said mechanism on an exposure to guard against duplication of exposures on the same film section, film-winding mechanism including a spool-pintle, means for actuating said pin relatively to said lever to again enable the shutter-opening mechanism on actuation of the film-winding mechanism to present a new film section for exposure, said means including a pulley loosely mounted on the pintle and having operating connection with the pin, means for locking the film-winding mechanism against actuation, and means for operatively connecting the pulley with the pintle for actuating the pin on release actuation of the locking means.

8. In a camera, the combination with the shutter-opening mechanism, the same including a pivoted lever, of a pin adapted to yieldingly project in the returning path of the lever for disabling said mechanism on an exposure to guard against duplication of exposures on the same film section, film-winding mechanism including a spool-pintle, means for actuating said pin relatively to said lever to again enable the shutter-opening mechanism on actuation of the film-winding mechanism to present a new film section for exposure, said means including a pulley loosely mounted on the pintle and having operating connection with the pin, means for locking the film-winding mechanism against actuation, means for releasing the film-winding mechanism including a manipulating member under the control of the operator of the camera, and means including a clutch for operatively connecting the pulley and pintle together for pin actuation on release actuation of said manipulative member.

9. In a camera, the combination with the shutter-opening mechanism, of means for disabling said mechanism on an exposure to guard against duplication of exposures on the same film-section, a rotatable member having operating connection with the disabling-means, a film spool pintle rotary means operable by the rotation of the pintle and axially movable to engage the rotatable member, whereby on rotation of the pintle the disabling-means will be actuated to again enable the shutter-opening mechanism, and means for normally holding the rotary means out of engagement with the rotatable member.

10. In a camera, the combination with the shutter-opening mechanism, of means for disabling said mechanism on an exposure to guard against duplication of exposures on the same film-section, a rotatable member having operating connection with the disabling-means, a film spool pintle, rotary means operable by the rotation of the pintle and axially movable to engage the rotatable member, whereby on rotation of the pintle the disabling means will be actuated to again enable the shutter-opening mechanism, means for yieldingly holding the rotary means normally out of engagement with the rotatable member, and manually operable means for moving the rotary means into operating engagement with the rotatable member.

11. In a camera, the combination with the shutter-opening mechanism, of means for disabling said mechanism on an exposure to guard against duplication of exposures on the same film-section, a rotatable member having operating connection with the disabling-means for actuating the same, rotary means operable by the rotation of the film-spool, and a friction member adapted to form an operating connection between the rotary means and the rotatable member.

12. In a camera, the combination with the shutter-opening mechanism, of means for disabling said mechanism on an exposure to guard against duplication of exposures on the same film-section, a film-spool pintle, a sleeve rotatable with the pintle, a pulley loosely carried on the sleeve and having operating connection with the disabling-means, and means for frictionally connecting the pulley with the sleeve, whereby, on rotation of the film-spool pintle, the disabling means will be actuated to again enable the shutter-opening mechanism.

13. In a camera, the combination with the shutter-opening mechanism, of means for disabling said mechanism on an exposure to guard against duplication of exposures on the same film-section, a film-spool pintle, a sleeve movable longitudinally on, and rotatable with, the pintle, a pulley loosely mounted on the sleeve, and having operating connection with the disabling means, means for releasably locking the pintle against rotation, and means for releasing the pintle and operatively connecting the sleeve and pulley, whereby on rotation of the pintle, the disabling means will be actuated to again enable the shutter-opening mechanism.

14. In a camera, the combination of film-winding mechanism, a shutter, shutter-opening mechanism, a movable member adapted to render the shutter-opening mechanism operative or inoperative, a pivoted lever for actuating said movable member, and means controlled by the film-winding mechanism for actuating the lever, said means including a pulley, and a pulling connection between the pulley and lever.

15. In a camera, the combination of a shutter, a lever for actuating said shutter, a pivoted member co-operating with the lever, the member and the lever being pivoted to move in different arcs, whereby the member passes the lever after operation, a movable member adapted to prevent the return of the pivoted member, and means for actuating the movable member to permit return of the pivoted member to its normal or operative position.

16. In a camera, the combination of a shutter, shutter-opening mechanism, a movable member associated therewith and adapted to disable the shutter-opening mechanism, a lever adapted to actuate said member to again enable the shutter-opening mechanism, and means for actuating the lever, said means including a film-spool pintle, a pulley loosely mounted on the pintle, means for operatively connecting the pintle and pulley, and a cord connected to the lever and to the pulley.

17. In a camera, the combination of a shutter, a lever for operating the shutter, a pivoted member for actuating the lever, a movable pin, means for yieldingly moving the pin into the path of movement of the pivoted member to prevent the completion of its return movement, film-winding mechanism, and means co-operating with the film-winding mechanism for moving the pin out of the path of movement of the pivoted member, thereby permitting the pivoted member to return to its normal or operative position.

18. In a camera, the combination of a shutter, shutter-opening mechanism, means for disabling the shutter-opening mechanism on an exposure to guard against duplication of exposures on the same film-section, film-winding mechanism, and means including an elastic member operable only on operation of the film-winding mechanism to actuate the disabling-means to again enable the shutter-opening mechanism.

19. In a camera, the combination with the shutter-opening mechanism, of a pin for disabling said mechanism on an exposure to guard against duplication of exposures on the same film-section, a film-spool pintle, a pulley mounted for rotation on the pintle, pin-operating connections between the pulley and the pin, and means including a clutch for connecting the pulley to the pintle, whereby on actuation of the pintle, the pin will be actuated to again enable the shutter-opening mechanism.

20. In a camera, the combination with the shutter-opening mechanism, of a pin for disabling said mechanism on an exposure to guard against duplication of exposures on the same film-section, a film-spool pintle, a pulley mounted for rotation on the pintle, pin-operating connections between the pulley and the pin, a clutch for operatively connecting the pulley and the pintle, means including a star wheel on the pintle and a fixed pin on the camera for locking the pintle against rotation, and means including a manipulative device under control of the operator for actuating the star wheel out of engagement with the pin and moving the clutch into engagement with the pulley, whereby on actuation of the pintle, the pin will be actuated to again enable the shutter-opening mechanism.

In testimony whereof, we have signed our names to this specification.

WILLIAM SAUL SMITH.
FREDERIC S. WILLIAMS.